US005550727A

United States Patent [19]

Fenyvesy

[11] Patent Number: 5,550,727

[45] Date of Patent: Aug. 27, 1996

[54] OUTDOOR ILLUMINATOR

[76] Inventor: Thomas P. Fenyvesy, 360 Monastery La., Matawan, N.J. 07747

[21] Appl. No.: 506,068

[22] Filed: Jul. 24, 1995

[51] Int. Cl.⁶ ........ B60Q 1/06

[52] U.S. Cl. ........ 362/386; 362/285; 362/286; 362/364; 362/375

[58] Field of Search ........ 362/386, 267, 362/153.1, 285, 286, 364, 418, 431, 276, 375, 373

[56] References Cited

U.S. PATENT DOCUMENTS

| | | | |
|---|---|---|---|
| 4,180,850 | 12/1979 | Bivens | 362/285 |
| 4,595,971 | 6/1986 | Dean | 362/373 |
| 4,974,134 | 11/1990 | Bourne | 362/286 |
| 4,984,139 | 1/1991 | Goggia | 362/153.1 |
| 5,003,441 | 3/1991 | Crowe et al. | 362/285 |
| 5,068,773 | 11/1991 | Toth | 362/153.1 |
| 5,142,463 | 8/1992 | Panagotacos et al. | 362/285 |
| 5,303,134 | 4/1994 | Curnado | 362/285 |

*Primary Examiner*—Stephen F. Husar
*Assistant Examiner*—Alfred Basichas
*Attorney, Agent, or Firm*—Charles I. Brodsky

[57] ABSTRACT

An outdoor illuminator to be used preferably for the illumination for gardens, parks, recreation areas and the like in which a light source is mounted in a transparent lampshade fixed onto a lamp post in an underground cabinet with closed walls—with the cabinet being provided with a perforated bottom plate, with the lampshade being equipped with a cover plate which firmly closes the upper opening of the cabinet by fitting tightly on its rim in a lowered, underground position of the illuminator, and with a guide piston attached to the lamp post which moves with the lamp post to close the upper opening of the cabinet in the raised position of the illuminator.

7 Claims, 3 Drawing Sheets

OUTDOOR ILLUMINATOR

FIELD OF THE INVENTION

This invention relates to outdoor illuminators, in general, and to one which is especially attractive for use in the illumination of gardens and parks, particular.

BACKGROUND OF THE INVENTION

As is well known and understood, outdoor illuminators for the illumination of the front gardens of family or row houses, entrances, backyards of the houses, promenades along recreation gardens, parks, swimming pools and public areas usually are located in close proximity, and are spiked into the ground to be powered from an underground electrical cable. As is also appreciated, such illuminators serve to hinder the necessary maintenance at these locations, as it is generally difficult to mow around the post incorporated as part of the illuminator. Thus, to properly maintain the area, the grass around the post is typically cut separately with a trimmer, instead of by the lawn-mower serving the rest of the area. As is also well known and understood, an obvious solution to this of merely removing the post is not satisfactory, because of the permanent installation with the underground cabling. Furthermore, where the outdoor illuminator is located in a public area, experience has shown that they tend to be subject to a greater amount of vandalism, or accidental damage by a passerby knocking into it, or tripping over it.

The teachings of various prior art patents are not generally helpful. In U.S. Pat. No. 4,827,389, for example, a portable lamp having a foldable post is described as being battery operated—its design and manner of installation, make it usable primarily only as a temporary light source. U.S. Pat. Nos. 3,911,267 and 3,308,306 respectively describe the lifting and sinking of a lamp holder on a post so as to change the height and position of the light source to increase or decrease the intensity of the illumination cast—obviously, the disadvantages associated with their placements at outdoor locations continue, as they still become subject to vandalism or accidental damage—and they continue to be difficult to mow about.

OBJECTS OF THE PRESENT INVENTION

It is an object of the present invention, therefore, to provide a new outdoor illuminator which avoids the problems and limitations of the prior art.

It is a further object of the invention to provide an outdoor illuminator, which allows for undisturbed park care and lawn-mowing, while at the same time protecting the light source and the post from vandalism and damage.

SUMMARY OF THE INVENTION

As will,become clear from the following description, these objects of the invention are achieved by an arrangement which allows the illuminator to be temporarily lowered below the ground level, when desired. As will be seen, this follows from utilizing an illuminator which is flexibly mounted in a cabinet with closed walls, and being able to be raised or lowered with respect to the ground, as needed. In the preferred embodiment to be described below, the cabinet will be seen to terminate in a perforated bottom plate—while a lamp-type shade is included with a cover plate fitting firmly on the rim of the cabinet, to close off the upper opening of the illuminator, with this lamp-type shade being positioned below ground level when the illuminator is lowered. Further, in completing the construction, the illuminator is connected to the lamp post with the help of a guide piston which moves the cabinet housing to close it in the upper position, once the illuminator is erected above ground.

BRIEF DESCRIPTION OF THE DRAWINGS

These and other features of the present invention will be more clearly understood from a consideration of the following description, taken in connection with the accompanying drawing, in which.

DETAILED DESCRIPTION OF THE DRAWINGS

Figure 1:
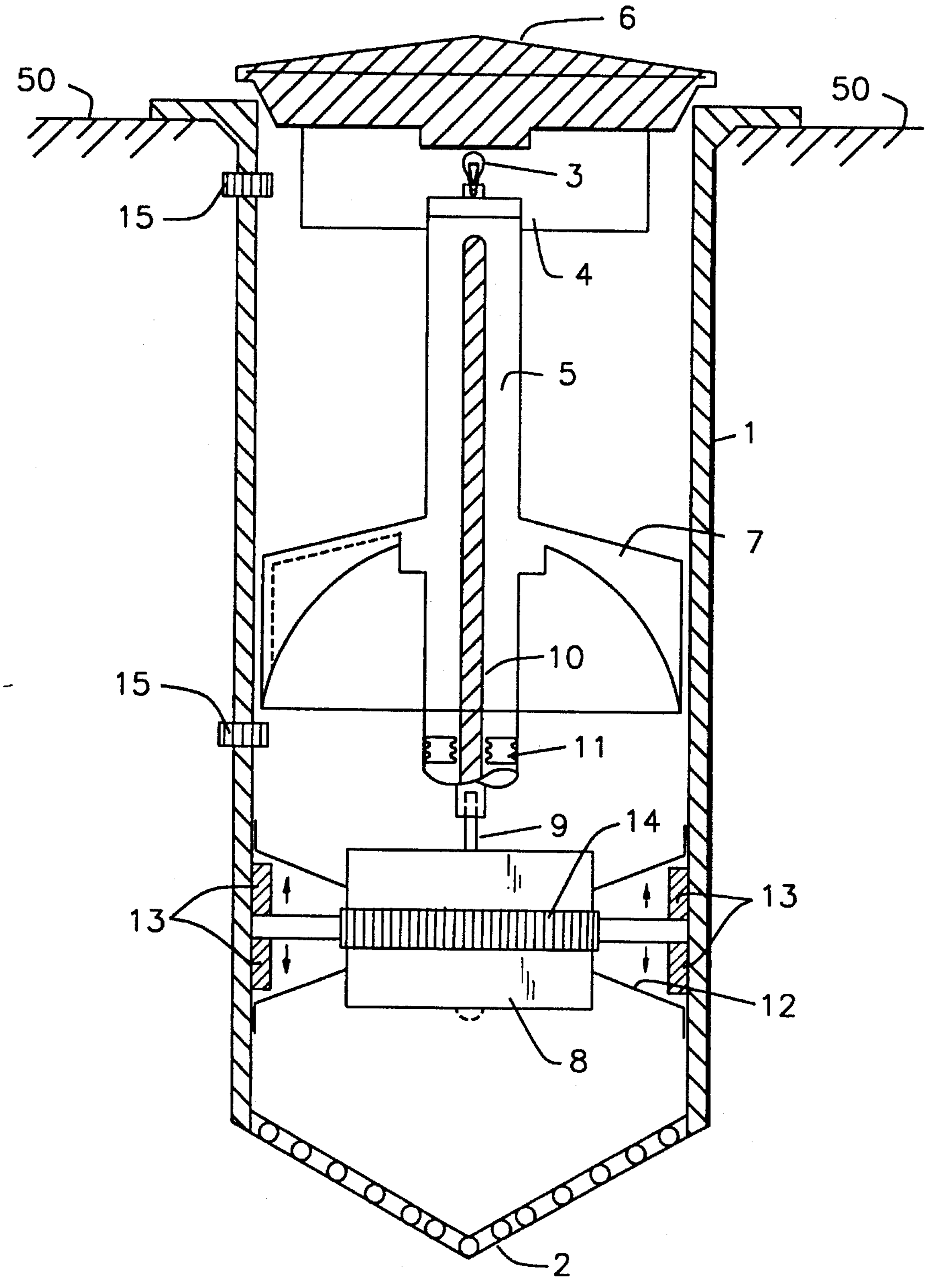
FIG. 1 is a cut-away sectional view of an outdoor illuminator which is raised or lowered with respect to the ground by means of an electric motor.

In the drawings, the illuminator of the invention is located in a cabinet 1 with closed walls, and installed below the ground level shown as 50. A bottom plate 2 closes off the cabinet 1, and preferably is perforated.

The light source of the illuminator is shown at 3, mounted within a transparent lampshade 4, which is secured onto a lamp post 5. A cover plate 6 closes off the lampshade 4, and fits to the upper rim of the cabinet 1 to likewise close it off. A guide piston 7 is mounted to the lamp post 5 within the cabinet 1, and connected to it so that the two move together to raise and lower the cover plate 6 in opening and closing the cabinet 1. As will be readily understood, cover plate 6 is shown for the positioning of the outdoor illuminator below ground level 50.

Also shown in FIG. 1 is an electrical motor 8 suitable to move the illuminator mounted in cabinet 1. In particular, a square-threaded guide shaft 10 is included to attach to the shaft 9 of the motor 8. Such guide shaft 10 then connects through a series of threads to a series of cones 11 fixed within the lamp post 5. The motor 8, in turn, is fixed in the cabinet 1 by any appropriate device, such as a three-point suspended motor fixing device 12, and by a motor holding clamp 14 which is inserted between included springs 13. A plurality of limit stops 15, contacted by the guide piston 7, are included on the walls of the cabinet in defining the upper and lower position of the illuminator. As will be appreciated, the limit stops 15 define the extents of movement as the outdoor illuminator is raised or lowered.

Figure 2:
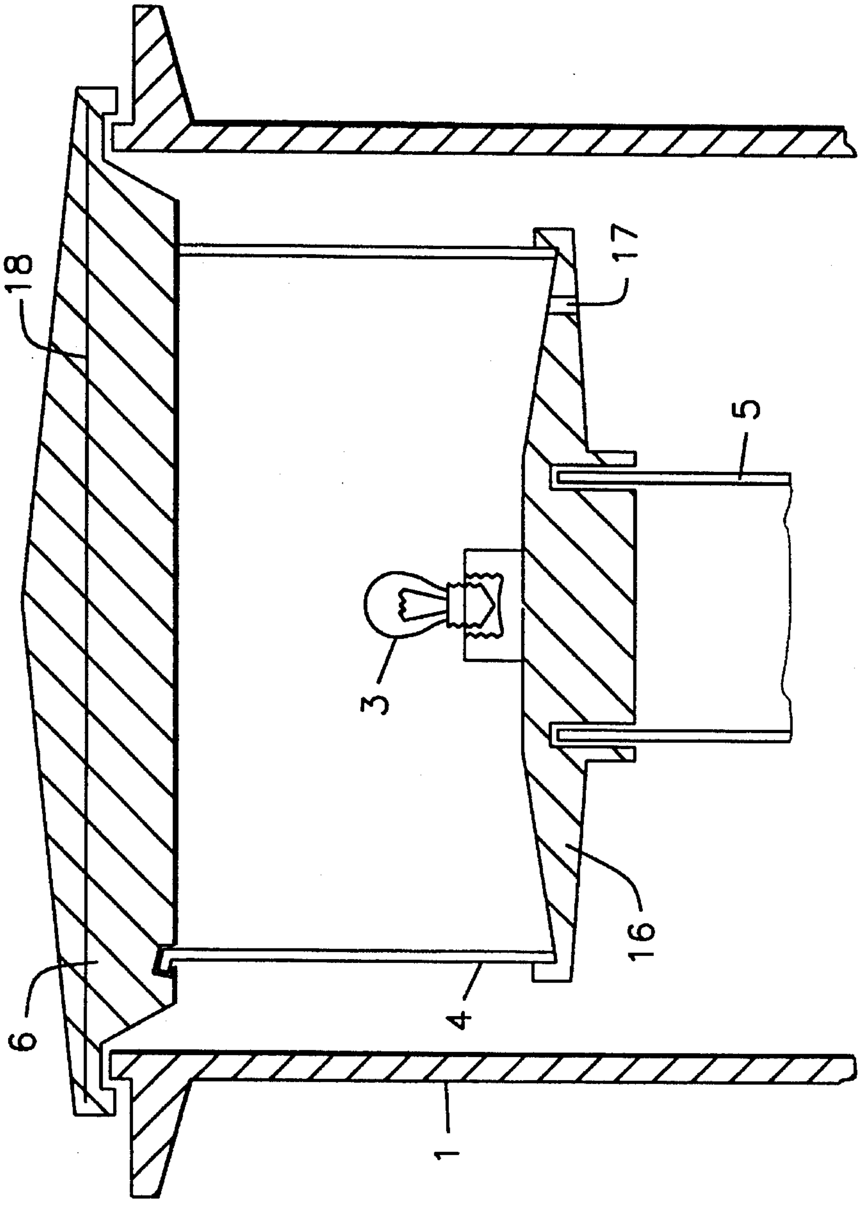
FIG. 2 illustrates the lampshade of the illuminator of FIG. 1.

FIG. 2 shows in detail the lampshade 4 of the illuminator of FIG. 1 as it might appear in a preferred construction. The lampshade 4 contains the light source 3 of any appropriate type, and closed off from below by a flexible holder plate 16 preferably of a hard rubber or polyvinylchloride composition. The lamp post 5 then connects to the holder plate 16. An air space 17 is provided in the holder plate 16 for flexibility in installation.

Similarly of a hard rubber or polyvinylchloride composition is the cover plate 6, to close off the upper opening of the cabinet 1 of the illuminator. Such cover plate 6 of the lampshade 4 will be seen to firmly fit onto the rim of the cabinet 1, and is provided with an embedded metal inlay 18 so as to fit flexibly.

Figure 3A:
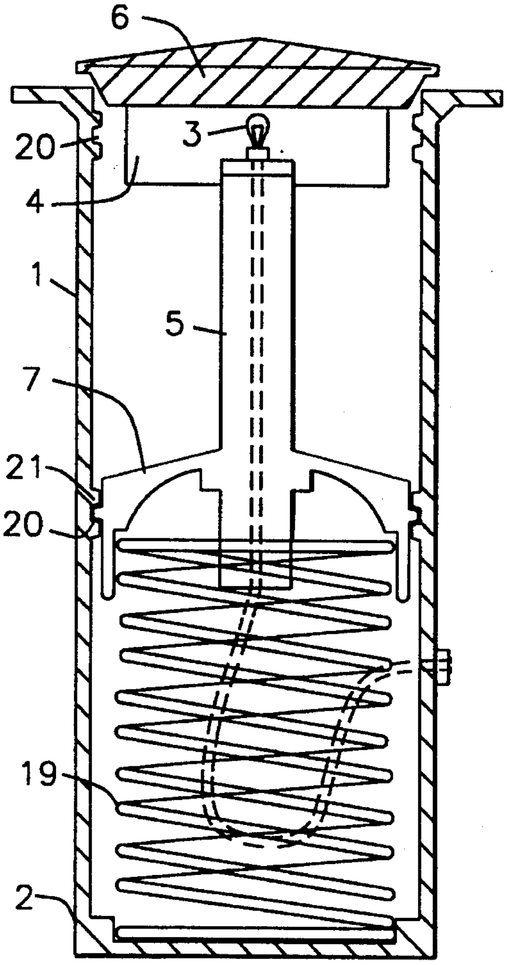
FIGS. 3*a* and 3*b* show a manual driven illuminator embodying the invention in its lowered and raised positions, respectively.
Figure 3B:
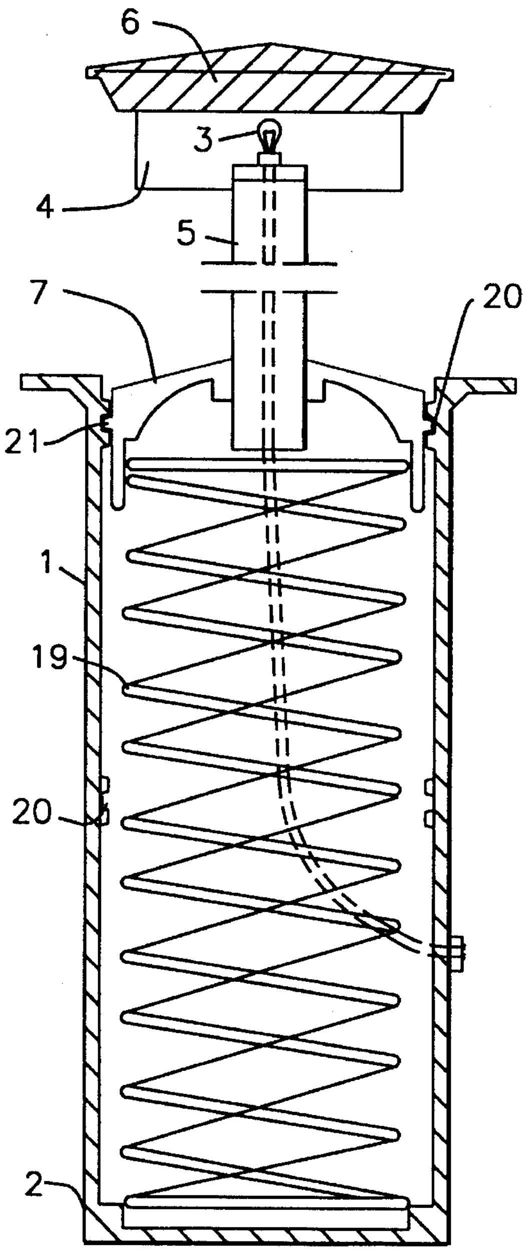

FIGS. 3*a* and 3*b* illustrate a manually operated version of the outdoor illuminator of the invention, as shown in its lowered and raised position, respectively. In the lowered position of FIG. 3*a*, the cover plate 6 of the lampshade 4 closes off the upper opening of the cabinet 1 as described above. A spring 19 is included, to support the illuminator, and is fitted onto the lamp post 5 between the guide piston 7 and the bottom plate 2, which will be understood to be perforated. A plurality of fixing grooves 20 are formed on the inside wall of the cabinet 1, to define the upper and lower position of the illuminator. A fixing pin 21 is located at each side of the guide piston 7 to fit between the grooves 20 in establishing the movement.

As will be appreciated by those skilled in the art, FIG. 3*a* represents the lowered position of the outdoor illuminator, with the spring 19 being compressed. In this position, the fixing of the illuminator below ground level is afforded by fitting the fixing pins 21 into the lower fixing grooves 20.

Likewise understood with respect to FIG. 3*b*, is the raised or erected, position of the illuminator, with the spring 19 being in its quiescent, or rest position, with the illuminator then being fixed by the fitting of the fixing pins 21 into the upper fixing grooves 20 which are positioned just under the rim of the cabinet.

As will be appreciated by those skilled in the art, the outdoor illuminators of this invention can be actuated manually, automatically, or by remote control, in any desired manner. In the case of an automated system, for example, raising and lowering of the illuminator can be controlled by a light sensor, or in accordance with a daily schedule, wherein the illuminator will remain in the cabinet 1, below ground level when not used. Such an arrangement is particularly advantageous for use in public areas to prevent daylight vandalism to the overall construction. At nightfall, such light sensor can then operate the system automatically, to raise the illuminator, and to then automatically lower it back into the underground cabinet for turning off, once dawn arises. This arrangement, designed for the motor version of the invention of FIG. 1, will be seen to operate in a similar manner for remote control.

In the case of the simpler, manually operated illuminators of FIGS. 3*a* and 3*b* on the other hand, the spring 19 which supports the illuminator and controls its raising to the desired height can simply be compressed by twisting the cover plate 6 to free the fixing pins 21 from the upper grooves 20, and then pushing down on the cover plate 6, to be thereafter fitted within the lower fixing grooves 20. For raising the outdoor illuminator manually, the cover plate 6 can be rotated again in the opposite direction, to free the fixing pins 21 from the lower fixing grooves 20, to be thereafter returned to the upper fixing grooves 20 once raised.

In a preferred construction of the invention the bottom plate 2 of the cabinet 1 is perforated so that any ground water entering the cabinet can seep away through the holes. The incursion of other dirt into the cabinet can be avoided, as will be understood, from the fact that in the lowered position of the illuminator (FIGS. 1, 2 and 3*a*), the cover plate 6 of the lampshade 4 closes off the opening of the cabinet 1, by firmly fitting onto its rim in providing a tight lock. Similarly, by having the upper part of the guide piston 7 slightly conical in configuration, it too serves to close off the opening of the cabinet 1 (FIG. 3*b*) to likewise act as a plug in closing the opening of the cabinet. In this respect, the configuration of the guide piston 7 can be selected to easily move upwardly and downwardly in the cabinet, while closing off the unit according to its cross-sectional shape.

In an actual construction of the illuminator, any appropriate shape can be employed as long as it supports the lowering and raising procedure, and of any appropriate material as would be corrosion resistant. According to preference, the illuminators 3 can be operated on low voltage, either provided by batteries or electrical transformers. Whether the shape of the illuminator selected be round, or angular, the light distributed by the lampshade 4 can be circular—or, with a suitable reflector, be directional.

While there have been described what are considered to be preferred embodiments of the present invention, it will be readily appreciated that modifications can be made by those skilled in the art without departing from the teachings herein of being able to remove an illuminating device completely from the garden, park or other area where installed when necessary, while at the same time providing protection against vandalism and damage when not needed for operation. For at least such reason, therefore, resort should be had to the claims appended hereto for a true understanding of the scope of the invention—in allowing outdoor illuminators to simply be removed out of the way during gardening work and so that grass areas can be closely cut in a single operation by lawn mowing, without added trimming and in a manner which significantly reduces the time spent in cutting.

I claim:

1. An outdoor illuminator for the illumination of front gardens, parks, recreation areas and the like, comprising:

a lamp post;

a transparent lampshade mounted on said lamp post and having a cover plate;

a light source mounted within said lampshade;

an underground cabinet having closed walls, a bottom plate, an opening and a rim;

a guide piston within said cabinet and connected to said lamp post;

and means for moving said guide piston upwardly and downwardly;

whereby said means moves said guide piston to close said opening of said underground cabinet when moved upwardly, and whereby said means moves said guide piston to seat said cover plate on said rim of said cabinet when moved downwardly;

wherein said means includes a compression spring; and wherein said compression spring is coupled between said bottom plate of said cabinet and said guide piston, wherein said guide piston include a pair of fixing pins, and wherein said walls of said cabinet are provided with a plurality of fixing grooves to receive said fixing pins for the raising and lowering of said transparent lampshade.

2. The outdoor illuminator of claim 1, wherein said transparent lampshade is rotatable to fit said fixing pins into said grooves, and to free said pins from said grooves in locking said lampshade in upwards or downwards position.

3. The outdoor illuminator of claim 1, wherein said bottom plate of said cabinet is perforated.

4. The outdoor illuminator of claim 1, wherein said lampshade mounts to said lamp post by a holder plate having an air hole.

5. The outdoor illuminator of claim 4, wherein said holder plate is of a rubber or polyvinylchloride composition.

6. The outdoor illuminator of claim 1, wherein said cover plate of said lampshade includes a metal inlay embedded within said cover plate.

7. The outdoor illuminator of claim 6, wherein said cover plate is of a flexible, hard rubber or polyvinylchloride composition.

* * * * *